United States Patent
Tsuji et al.

(10) Patent No.: US 10,368,377 B2
(45) Date of Patent: Jul. 30, 2019

(54) NON-TRANSITORY COMPUTER-READABLE RECORDING MEDIUM STORING COMPUTER-READABLE INSTRUCTIONS FOR COMMUNICATION DEVICE, COMMUNICATION DEVICE, AND METHOD EXECUTED BY COMMUNICATION DEVICE

(71) Applicant: Brother Kogyo Kabushiki Kaisha, Nagoya-shi, Aichi-ken (JP)

(72) Inventors: Ryoya Tsuji, Nagoya (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/909,154

(22) Filed: Mar. 1, 2018

(65) Prior Publication Data

US 2018/0255593 A1   Sep. 6, 2018

(30) Foreign Application Priority Data

Mar. 2, 2017   (JP) .................................. 2017-039653

(51) Int. Cl.
*H04W 76/11*   (2018.01)
*H04W 92/10*   (2009.01)
(Continued)

(52) U.S. Cl.
CPC ............ *H04W 76/11* (2018.02); *H04L 67/104* (2013.01); *H04W 92/10* (2013.01); *H04L 67/141* (2013.01);
(Continued)

(58) Field of Classification Search
CPC ..... H04W 76/11; H04W 92/10; H04W 76/15; H04W 4/80; H04W 8/005; H04L 67/104; H04L 67/141; H04L 69/14
See application file for complete search history.

(56) References Cited

U.S. PATENT DOCUMENTS

2013/0260818 A1    10/2013   Suzuki et al.
2014/0320910 A1*   10/2014   Shimazaki ............ G06F 3/1292
                                                              358/1.15
(Continued)

FOREIGN PATENT DOCUMENTS

JP   2013-214803 A   10/2013

OTHER PUBLICATIONS

Wi-Fi Alliance, "Wi-Fi Peer-to Peer (P2P) Technical Specification", Version 1.5, pp. 1-183, 2014.

*Primary Examiner* — Duc C Ho
(74) *Attorney, Agent, or Firm* — Banner & Witcoff, Ltd.

(57) ABSTRACT

In a case where a first wireless communication with an external device is executed via a first wireless interface, a communication device may determine whether a specific signal including parent station information is received from the external device via a second wireless interface. The parent station information may indicate that an operation state of the external device is a state in which the external device operates as a parent station of a wireless network. The communication device may supply a communication instruction to the second wireless interface in a case where it is determined that the specific signal including the parent station information is received. The communication instruction may be for executing a second wireless communication with the external device via the second wireless interface. The second wireless communication may include a communication for participating as a child station in the wireless network.

8 Claims, 6 Drawing Sheets

(51) Int. Cl.
*H04L 29/08* (2006.01)
*H04W 8/00* (2009.01)
*H04W 4/80* (2018.01)
*H04L 29/06* (2006.01)
*H04W 76/15* (2018.01)

(52) U.S. Cl.
CPC ............... *H04L 69/14* (2013.01); *H04W 4/80* (2018.02); *H04W 8/005* (2013.01); *H04W 76/15* (2018.02)

(56) References Cited

U.S. PATENT DOCUMENTS

2015/0205550 A1* 7/2015 Lee ..................... G06F 3/1204
358/1.15
2016/0316511 A1 10/2016 Suzuki et al.

* cited by examiner (Comparative Embodiment 1)

US 10,368,377 B2

NON-TRANSITORY COMPUTER-READABLE RECORDING MEDIUM STORING COMPUTER-READABLE INSTRUCTIONS FOR COMMUNICATION DEVICE, COMMUNICATION DEVICE, AND METHOD EXECUTED BY COMMUNICATION DEVICE

TECHNICAL FIELD

The present application discloses a technique for a communication device to participate as a child station in a wireless network in which an external device operates as a parent station,

BACKGROUND ART

A communication system including an MFP (abbreviation of Multi-Function Peripheral) and a mobile terminal is known. Upon an NFC link with the mobile terminal being established, the MFP shifts to the G/O (abbreviation of Group Owner) state of the WFD (abbreviation of Wi-Fi Direct (registered trademark)) scheme, and prepares a wireless setting (SSID (abbreviation of Service Set Identifier), password, etc.) to be used in a WFD network in which the MFP operates as a parent station. Upon receiving the wireless setting from the MFP by using the NFC link, the mobile terminal establishes a wireless connection with the MFP by using the wireless setting, and participates as a client of the WFD scheme in the WFD network.

SUMMARY

A certain amount of time (e.g., 1 to 2 seconds) may be needed in order to shift the operation state of the MFP to the G/O state from a state other than the G/O state of the WFD scheme. If a wireless communication for establishing a wireless connection between the MFP and the mobile terminal is executed before shifting to the G/O state is completed in the MFP, the establishment of the wireless connection may fail.

The present application discloses a technique for a communication device to appropriately participate as a child station in a wireless network in which an external device operates as a parent station.

A non-transitory computer-readable recording medium storing computer-readable instructions for a communication device is disclosed. The computer-readable instructions, when executed by a processor of the communication device, may cause the communication device to: in a case where a first wireless communication with an external device is executed via a first wireless interface of the communication device, determine whether a specific signal including parent station information is received from the external device via a second wireless interface of the communication device, the second wireless interface being different from the first wireless interface, the parent station information indicating that an operation state of the external device is a state in which the external device operates as a parent station of a wireless network; and supply a communication instruction to the second wireless interface in a case where it is determined that the specific signal including the parent station information is received, the communication instruction being for executing a second wireless communication with the external device via the second wireless interface, the second wireless communication including a communication for participating as a child station in the wireless network in which the external device operates as the parent station, wherein the communication instruction may not be supplied to the second wireless interface in a case where it is determined that the specific signal including the parent station information is not received.

The communication device itself and a method executed by the communication device are also novel and useful. Further, a system which comprises the communication device and the external device is also novel and useful.

EMBODIMENTS

First Embodiment

Figure 1:
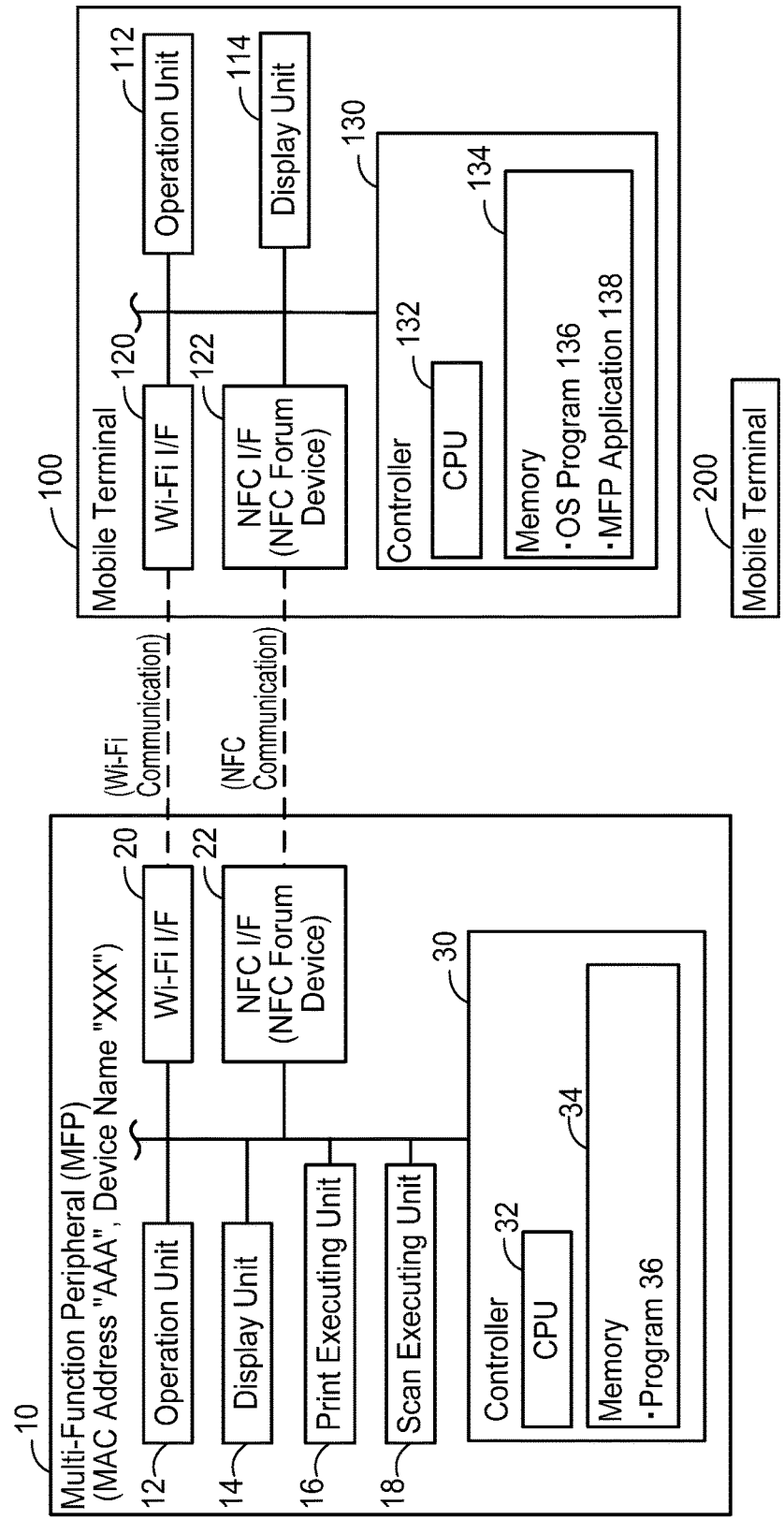
FIG. 1 shows a configuration of a communication system.

Configuration of Communication System 2; FIG. 1

As shown in FIG. 1, a communication system 2 comprises a multi-function peripheral (called "MFP" below) 10 and a mobile terminal 100. The MFP 10 and the mobile terminal 100 are capable of mutually executing a Wi-Fi communication, which is a wireless communication according to Wi-Fi scheme, and mutually executing an NFC (abbreviation of Near Field Communication) communication, which is a wireless communication according to NFC scheme.

Configuration of MFP 10

The MFP 10 is a peripheral device (e.g., a peripheral device of a PC, etc.) capable of executing multiple functions including a print function and a scan function. A MAC address "AAA" and a device tame "XXX" are allocated to the MFP 10. The MFP 10 comprises an operation unit 12, a display unit 14, a print executing unit 16, a scan executing unit 18, a Wi-Fi interface (interface is referred to as "I/F" below) 20, an NFC I/F 22, and a controller 30.

The operation unit 12 comprises a plurality of keys. A user can input various instructions to the MFP 10 by operating the operation unit 12. The display unit 14 is a display capable of displaying various kinds of information using a character string or an icon image, and also functions as a so-called touch panel (i.e., operation unit). The print executing unit 16 is a printing mechanism such as an ink jet scheme, laser scheme. The scan executing unit 18 is a scanning mechanism such as a CCD, CIS.

The Wi-Fi I/F 20 is an I/F for executing Wi-Fi communication according to the Wi-Fi scheme. The Wi-Fi scheme is a wireless communication scheme based on e.g., IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 20 supports, in particular, the WFD (abbreviation of Wi-Fi Direct (registered trademark)) scheme formulated by the Wi-Fi Alliance. The WFD scheme is a wireless communication scheme described in the standard document "Wi-Fi Peer-to-Peer (P2P) Technical Specification Version 1.5" created by the Wi-Fi.

The MFP 10 operates in Group Owner (referred to as "G/O" below) state of the WFD scheme, and forms a WFD network, (referred to as "WFDNW" below) in which the MFP 10 operates as a parent station (i.e., G/O). Thereupon, the MFP 10 can establish a Wi-Fi connection with the mobile terminal 100, and cause the mobile terminal 100 to participate as a child station (i.e., a client of the WFD scheme) in the WFDNW.

Further, the Wi-Fi I/F 20 supports WPS (abbreviation of Wi-Fi Protected Setup) formulated by the Wi-Fi Alliance. WPS is a so-caned automatic wireless setting or easy wireless setting, and is a technology allowing easy establishment of a Wi-Fi connection between a pair of devices without the user inputting wireless setting information (e.g., password, authentication scheme, encryption scheme, etc.) in order to establish a wireless connection according to the Wi-Fi scheme (called "Wi-Fi connection" below).

The NFC I/F 22 is an DT for executing an NFC communication according to the NFC scheme. The NFC scheme is a wireless communication scheme based on an international standard, such as ISO/IEC14443, 15693, 18092. Moreover, an I/F called an NFC forum device, and an I/F called an NFC forum tag are known as types of I/F for executing the NFC communication. The NFC I/F 22 is an NFC forum device, and is an I/F capable of selectively operating in any of a P2P (abbreviation of Peer To Peer) mode, a RI W (abbreviation of Reader/Writer) mode, and a CE (abbreviation of Card. Emulation) mode.

Next, differences between the Wi-Fi I/F 20 and the NFC I/F 22 will be described. A communication speed of the Wi-Fi communication via the Wi-Fi I/F 20 (e.g., maximum communication speed is 11 to 600 Mbps) is higher than a communication speed of the NFC communication via the NFC I/F 22 (e.g., maximum communication speed is 100 to 424 Kbps). Further, a frequency of a carrier wave (e.g., a 2.4 GHz band or 5.0 GHz band) in the Wi-Fi communication via the Wi-Fi I/F 20 is different from a frequency of a carrier wave (e.g., a 13.56 MHz band) in the NFC communication via the NFC PE 22. Further, a maximum distance at which the Wi-Fi communication via the Wi-Fi I/F 20 can be executed (e.g., about 100 m at maximum) is longer than a maximum distance at which the NFC communication via the NFC I/F 22 can be executed (e.g., about 10 cm at maximum).

The controller 30 comprises a CPU 32 and a memory 34. The CPU 32 executes various processes in accordance with a program 36 stored in the memory 34. The memory 34 is constituted of a volatile memory, non-volatile memory, etc.

Configuration of Mobile Terminal 100

The mobile terminal 100 is a portable terminal device such as a mobile telephone, a smartphone, a PDA, a notebook PC, a tablet PC, a portable music playback device or a portable movie playback device. The mobile terminal 100 comprises an operation unit 112, a display unit 114, a Wi-Fi I/F 120, an NFC I/F 122, and a controller 130.

The operation unit 112 comprises a plurality of keys. The user can input various instructions to the mobile terminal 100 by operating the operation unit 112. The display unit 114 is a display for displaying various information, and also functions as a so-called touch panel (i.e., operation unit). Below, the operation unit 112 and the display unit 114 may collectively be termed "terminal operation unit". The Wi/Fi I/F 120 and the NFC I/F 122 are the same as the Wi-Fi I/F 20 and the NFC I/F 22 of the MFP 10, respectively.

The controller 130 comprises a CPU 132 and a memory 134. The CPU 132 executes various processes in accordance with programs 136, 138 stored in the memory 134. The OS (abbreviation of Operating System) program 136 is a program for controlling various basic operations of the mobile terminal 100. Further, the MFP application 138 is an application provided by a vendor of the MFP 10, etc. and is installed in the mobile terminal 100 from, e.g., a server on the Internet. The MFP application 138 is an application for establishing a Wi-Fi connection between the mobile terminal 100 and the MFP 10, etc., and executing a communication of target data (e.g., print data, scan data) between the mobile terminal 100 and the MFP 10, etc. by using the Wi-Fi connection. Below, the MFP application 138 is simply called "application 138".

In the present embodiment, further, a mobile terminal 200 is present in the surroundings of the MFP 10. The mobile terminal 200 comprises the same configuration as the mobile terminal 100, excepting for a point of not comprising the application 138.

Figure 2:
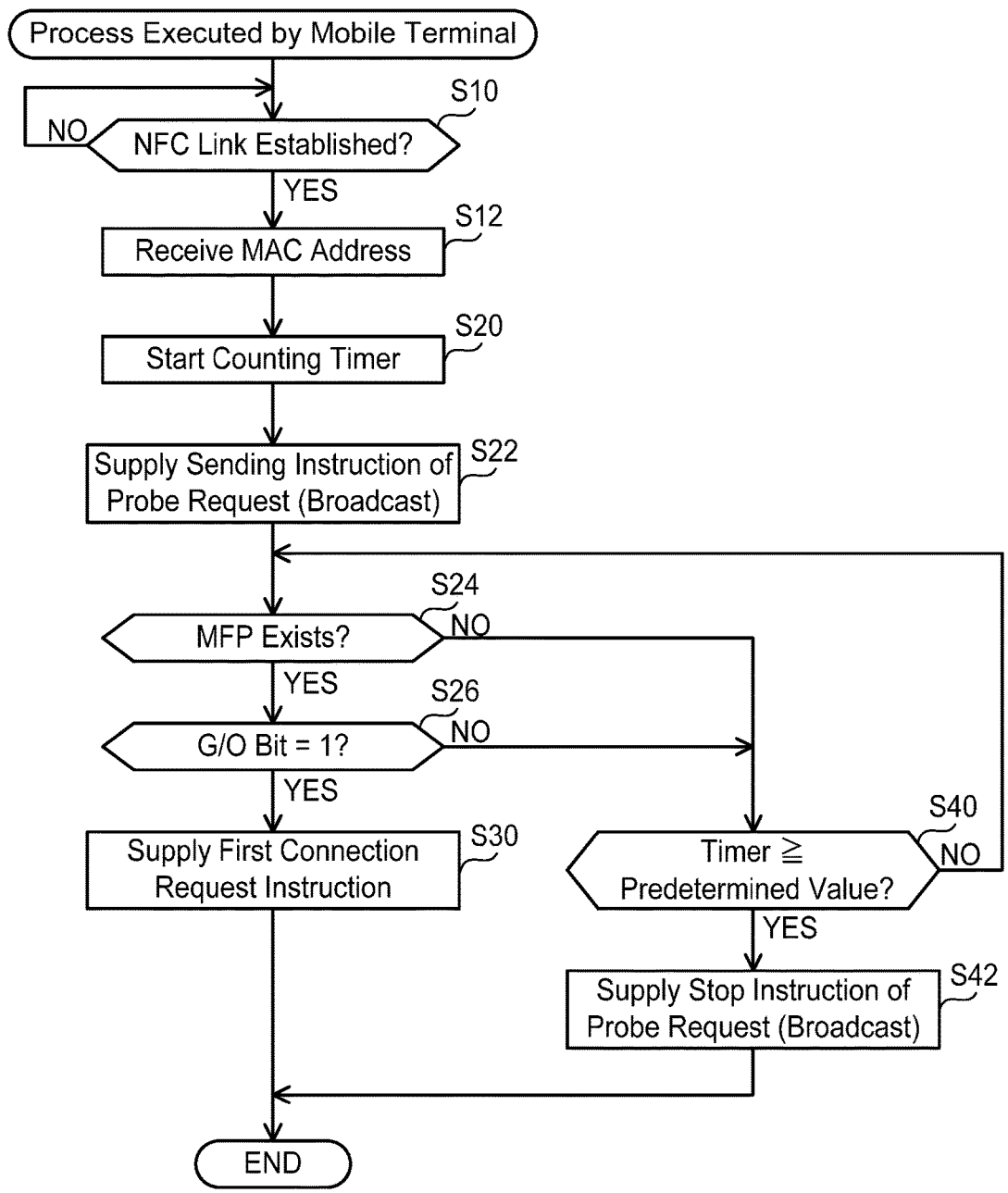
FIG. 2 shows a flowchart of processes executed by a mobile terminal.

Process Executed by Mobile Terminal 100; FIG. 2

Next, contents of a process executed by the CPU 132 of the mobile terminal 100 in accordance with the application 138 will be described with reference to FIG. 2. In a case where an operation for activating the application 138 is executed in the terminal operation unit, the CPU 132 starts the process of FIG. 2. It should be noted that, below, for convenience of explanation, the subject of processes executed by the CPU 132 according to the application 138, and the subject of processes executed by the CPU 132 according to the OS program 136 are referred to as "application 138" and "OS 136" respectively without referring to the CPU 132 as the subject.

In S10, the application 138 monitors whether an NFC link has been established between the MFP 10 and the mobile terminal 100. In a case of obtaining NFC establishment information indicating that the NFC link has been established from the NFC I/F 122, the application 138 determines YES in S10, and proceeds to S12.

In S12, the application 138 receives the MAC address "AAA" of the MFP 10 from the MFP 10 via the NFC I/F 122. In this occasion, the application 138 starts counting of a timer in S20.

In S22, the application 138 supplies, to the OS 136, a broadcast sending instruction for sending a Probe request by broadcast. In this occasion, the OS 136 supplies the broadcast sending instruction to the Wi-Fi I/F 120. Thereby, the Wi-Fi I/F 120 repeats sending the Probe request by broadcast until obtaining a first connection request instruction of S30 or a stop instruction of S42 (to be described later). In response to the sending of the Probe request, the OS 136 receives a Probe response via the Wi-Fi 120 from each of one or more target devices (e.g., the MFP 10). The Probe response includes a MAC address and a G/O bit of a transmission source target device. The G/O bit is information included in P2PIE (abbreviation of Information Element) in the Probe response. The G/O bit is set to either value of "0", indicating that the operation state of the target device is not the G/O state, or "1", indicating that the operation state of the target device is the G/O state. The Probe response further includes a device name of the target device in a case where the transmission source target device is not operating in the G/O state, and includes an SSID (abbreviation of Service Set Identifier) of the WFDNW formed by the target device in a case where the transmission source target device is operating in the G/O state. Then, the OS 136 supplies the information. (i.e., MAC address, device name, SSID, G/O bit, or the like.) in the one or more Probe responses, to the application 138.

In S24, the application 138 determines whether a Probe response has been received from the MFP 10. Specifically, the application 138 determines whether the information obtained from the OS 136 includes the MAC address "AAA" of the MFP 10 received in S12, in a case where the information obtained from the OS 136 includes the MAC address "AAA", the application 138 determines YES in S24, and proceeds to S26. On the other hand, in a case where the information obtained from the OS 136 does not include the MAC address "AAA", the application 138 determines NO in S24, and proceeds to S40.

In S26, the application 138 determines whether the G/O bit in the Probe response received from the MFP 10 indicates "1". That is, the application 138 determines whether the operation state of the MFP 10 is the G/O state. In a case where it is determined that the G/O bit is "1" (YES in S26), i.e., in a case where it could be confirmed that the operation state of the MFP 10 is the G/O state, the application 138 proceeds to S30. On the other hand, in a case where it is determined that the G/O bit is "0" (NO in S26), i.e., in a case where it could not be confirmed that the operation state of the MFP 10 is the G/O state, the application 138 proceeds to S40 without proceeding to S30. As described above, the application 138 determines Whether the operation state of the MFP 10 is the G/O state by using the Probe response received from the MFP 10. The Probe request and the Probe response are signals conforming to standards of Wi-Fi communication. In the present embodiment, since the above determination is executed using the signals conforming to this standard, the configuration of the MFP 10 and the application 138 is simpler than, for example, a configuration in Which the above determination is executed using special signals not conforming to this standard.

In S30, the application 138 supplies a first connection request instruction to the OS 136. The first connection request instruction includes a unicast sending instruction for sending a Probe request including the MAC address "AAA" received in S12, and an establishment instruction for executing a process for establishing a Wi-Fi connection with, the MFP 10. Upon obtaining the first connection request instruction, the OS 136 supplies the unicast sending instruction to the Wi-Fi I/F 120. Thereby, the Wi-Fi I/F 120 stops sending the Probe request by broadcast, and sends a Probe request including the MAC address "AAA". In response to the sending of the Probe request to the MFP 10, the OS 136 receives, via the Wi-Fi 120, the Probe response including the MAC address "AAA", an SSID "YYY", and the G/O bit "1".

Then, in accordance with the establishment instruction, the OS 136 executes a connection process for establishing a Wi-Fi connection with the MFP 10 which is in the G/O state. The connection process includes sending a Service Discovery request, receiving a response thereto, sending a Provision Discovery request, receiving a response thereto, communication of a WSC Exchange, sending an Authentication request, receiving a response thereto, sending an Association request, receiving a response thereto, and communication of a 4-way Handshake, in the WSC Exchange, the OS 136 receives wireless setting information. (i.e., SSID "YYY", password "PPP", etc.) to be used in the WFDNW, from the MFP 10. Then, the OS 136 sends the wireless setting information to the MFP 10 and, since authentication of the wireless setting information succeeds in the MFP 10, the OS 136 establishes a Wi-Fi connection with the MFP 10. Thereby, the OS 136 can cause the mobile terminal 100 to participate in the WFDNW as a child station (i.e., a client of the WFD scheme). When S30 ends, the process of FIG. 2 ends.

Further, in S40, the application 138 determines whether a count value of the timer is equal to or above a predetermined value. In a case where the count value of the timer is equal to or above the predetermined value, the application 138 determines YES in S40, and proceeds to S42. On the other hand, in a case where the count value of the timer is less than the predetermined value, the application 138 determines NO in S40, and returns to S24.

In S42, the application 138 supplies a stop instruction of the Probe request to the OS 136. Upon obtaining the stop instruction, the OS 136 supplies the stop instruction to the Wi-Fi I/F 120. Thereby, the Wi-Fi I/F 120 stops sending the Probe request by broadcast. For example, in a situation where power of the MFP 10 is turned OFF after establishment of the NFC link of S10, the Probe response is not received from the MFP 10 (NO in S24). Further, for example, in a situation where the MFP 10 cannot operate in the G/O state for some reason, the Probe response is received from the MFP 10, but it cannot be confirmed that the MFP 10 operates in the G/O state (NO in S26). In these situations, the stop instruction is supplied to the OS 136 in S42. As a result, it is possible to suppress the repeated sending of the Probe request in a situation Where it is impossible to participate in the WFDNW. When S42 ends, the process of FIG. 2 ends.

Specific Case

Figure 3:
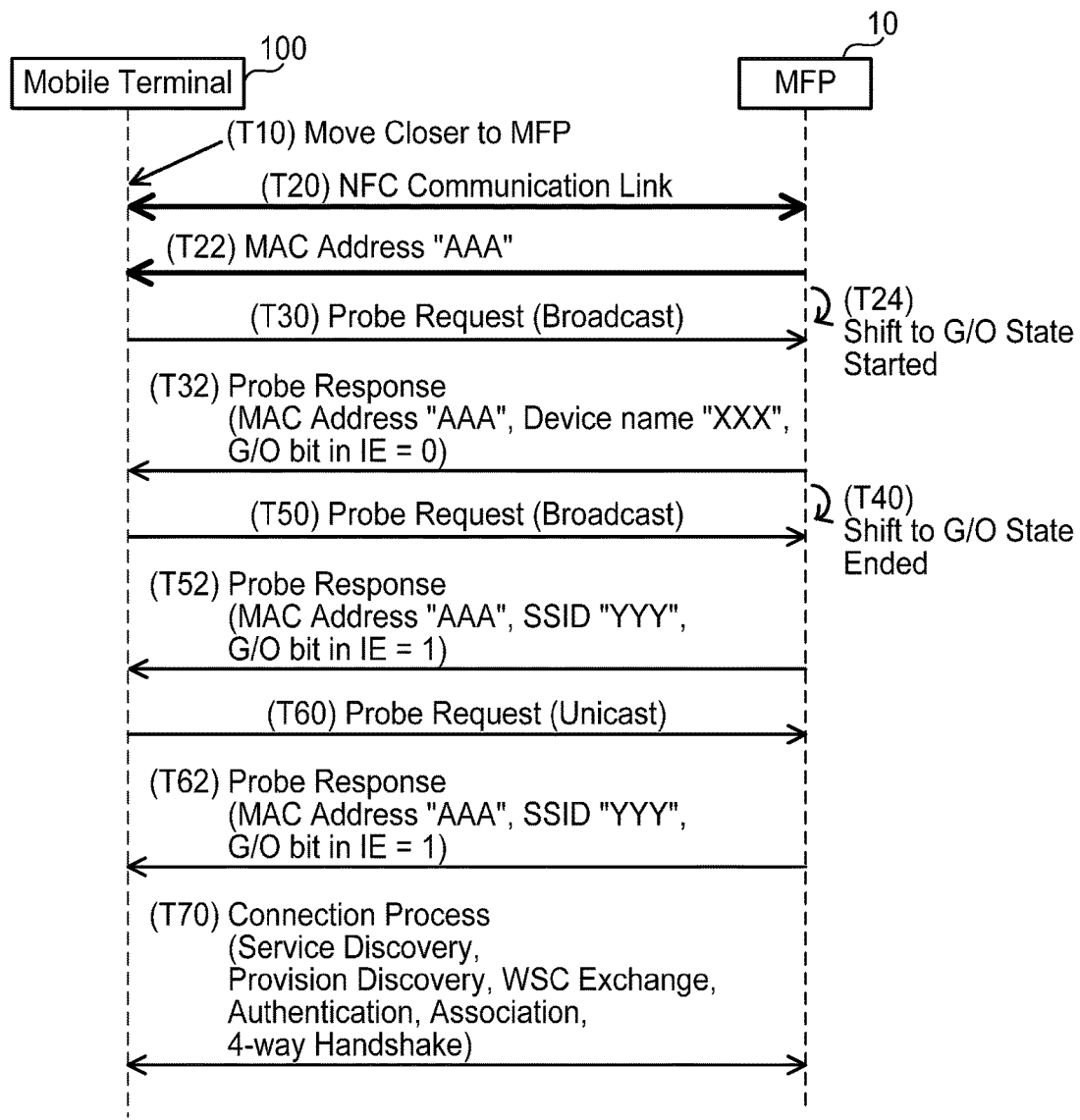
FIG. 3 shows a sequence diagram of establishment of a Wi-Fi connection between the mobile terminal and an MFP.

Next, a specific case realized by the process of FIG. 2 will be described with reference to FIG. 3. In FIG. 3, a thick arrow indicates NFC communication, and a thin arrow indicates Wi-Fi communication.

In T10, upon the user moving the mobile terminal 100 closer to the MFP 10, in T20, an NFC link is established between the MFP 10 and the mobile terminal 100 (YES in S10 of FIG. 2). In this occasion, in 122, the mobile terminal 100 receives the MAC address "AAA" from the MFP 10 by using the NFC link (S12).

Upon the NFC link being established, in T24, the MFP 10 starts a G/O shift operation for shifting the operation state of the MFP 10 to the G/O state from a state that is not the G/O state. Specifically, the G/O shift operation includes the CPU 32 changing from a state where operation of the Wi-Fi I/F 20 is not enabled (e.g., a state where power is not supplied to the Wi-Fi I/F 20) to a state where operation of the Wi-Fi I/F 20 is enabled. (e.g., a state where power is supplied to the Wi-Fi I/F 20). The G/O shift operation further includes, in the state where the operation of the Wi-Fi I/F 20 is enabled, the CPU 32 supplying, to the Wi-Fi I/F 20, a start instruction for starting an operation relating to the G/O (sending of a beacon signal). Upon obtaining the start instruction, the Wi-Fi I/F 20 starts the operation relating to the G/O. As such, in order to shift the operation state of the MFP 10 to the G/O state, the Wi-Fi I/F 20 needs be enabled and the operation relating to the G/O started, requiring a certain amount of time (called "G/O shift time" below). In a case of obtaining completion information indicating that the operation relating to the G/O has been started from the Wi-Fi I/F 20, the CPU 32 determines that the G/O shift operation has been completed. Thereby, the WFDNW is formed in which the MFP 10 operates as a parent station (i.e., G/O).

In T30, the mobile terminal 100 sends a Probe request by broadcast (S22). As described above, the operation state of the MFP 10 is not the G/O state in the period from the G/O shift operation is started in T24 until the G/O shift operation is completed (i.e., until the G/O shift time has elapsed). For this reason, in T32, the mobile terminal 100 receives a Probe response including the MAC address "AAA", the device name "XXX", and the G/O bit "0" from the MFP 10. In this occasion, the mobile terminal 100 determines that a Probe response has been received from the MFP 10 (YES in S24), but determines that the G/O bit in the Probe response is "0" (NO in S26), and does not execute the process (S30) for establishing a Wi-Fi connection with the MET 10.

In T40, the MFP 10 shifts to the G/O state upon completion of the G/O shift operation. Thereby, the MFP 10 forms the WFDNW, and creates wireless setting information (SSID "YYY", password "PPP", or the like.) to be used in the WFDNW.

In T50, the mobile terminal 100 re-sends the Probe request by broadcast. Since the operation state of the MFP 10 is the G/O state at this stage, in T52, the mobile terminal 100 receives a Probe response including the MAC address "AAA", the device name "YYY", and the G/O bit "1" from the MFP 10. In this occasion, the mobile terminal 100 determines that a Probe response has been received from the MFP 10 (YES in S24), and determines that the G/O bit in the Probe response is "1" (NO in S26). That is, the mobile terminal 100 can confirm that the operation state of the MFP 10 is the G/O state, and proceeds to the process for establishing a Wi-Fi connection with the MFP 10 (S30).

Specifically, in T60, the mobile terminal 100 sends, to the MFP 10, a Probe request including the MAC address "AAA" of the MFP 10 and, in T62, receives a Probe response from the MFP 10. Then, in 170, the mobile terminal 100 receives the wireless setting information of the WFDNW from the MFP 10, and establishes a Wi-Fi connection with the MFP 10 by using the wireless setting information. Thereby, the mobile terminal 100 can participate as a child station in the WFDNW. Although not shown, the application 138 can, in response to an instruction from the user, execute a communication of target data (e.g., print data or scan data) with the MFP 10 by using the WFDNW.

Comparative Embodiment 1

Next, a comparative embodiment 1, in which establishment of a Wi-Fi connection is failed between the MFP 10 and the mobile terminal 200 not comprising the application 138, will be described with reference to FIG. 4.

Figure 4:
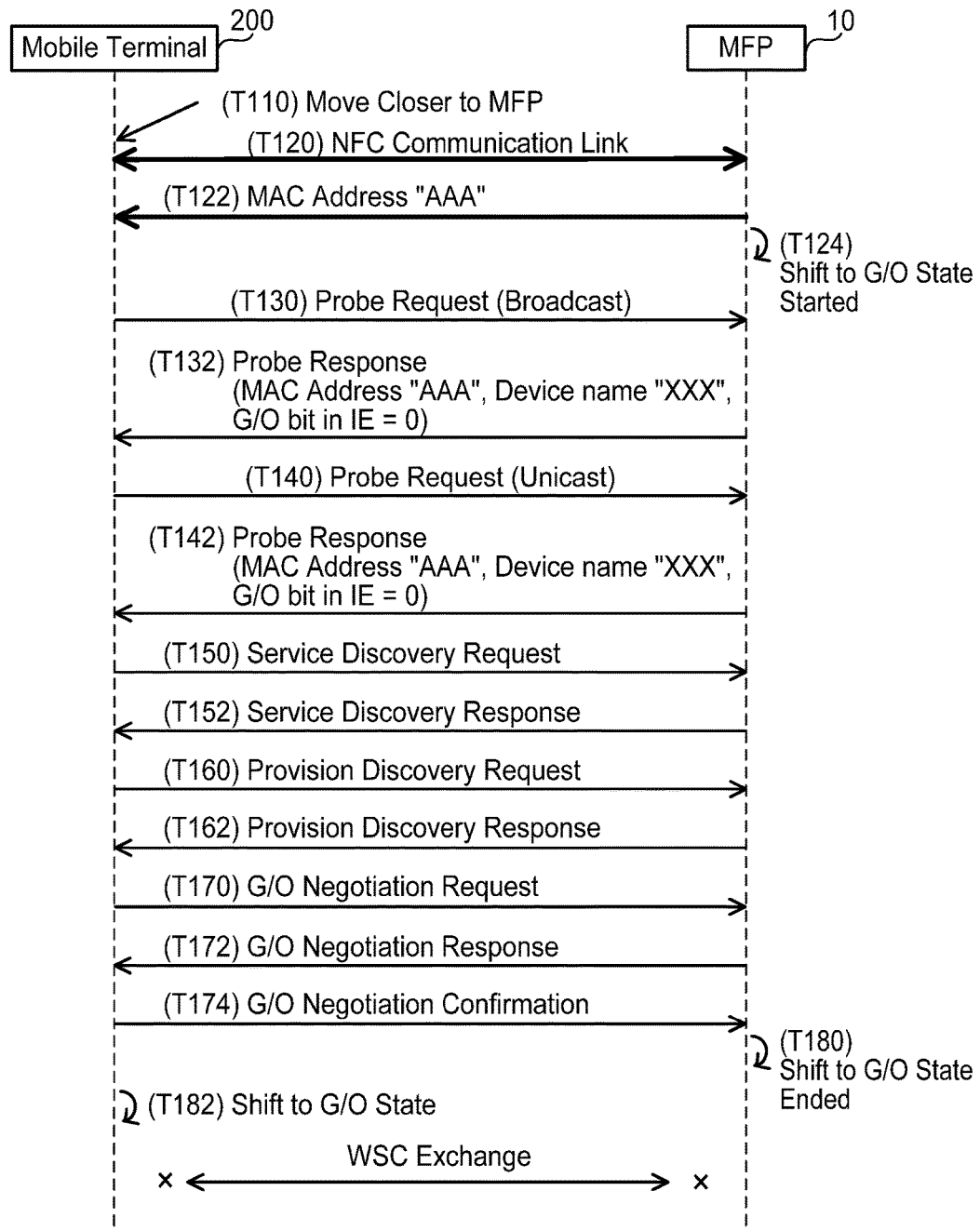
FIG. 4 shows a sequence diagram of failing to establish a Wi-Fi connection between the mobile terminal and the MFP in comparative embodiment 1.

T110 to T132 of FIG. 4 are the same as T10 to T32 of FIG. 3. Upon receiving a Probe response in T132, the mobile terminal 200 determines that a Probe response has been received from the MFP 10, and sends to the MFP 10, in T140, a Probe request including the MAC address "AAA" of the MFP 10. Since the G/O shift operation has not been completed in the MFP 10 at this stage, in T142, the mobile terminal 200 receives a Probe response including the MAC address "AAA", the device name "XXX", and the G/O bit "0" from the MFP 10. In this occasion, since the G/O bit in the Probe response indicates "0", the mobile terminal 200 determines that the operation state of the MFP 10 is not the G/O state, but is the device state of the WFD scheme (i.e., a state that is neither the G/O state nor the client state). Consequently, the mobile terminal 200 executes the following process for establishing a Wi-Fi connection with the MFP 10 that is in the device state.

That is, in T150, the mobile terminal 200 sends a Service Discovery request to the MFP 10 and, in T152, receives a response thereto from the MFP 10. Next, in T160, the mobile terminal 200 sends a Provision Discovery request to the MFP 10 and, in T162, receives a response thereto from the MFP 10. Next, in T170, the mobile terminal 200 sends a G/O Negotiation request to the MFP 10 and, in T172, receives a response thereto from the MFP 10.

Upon receiving a G/O Negotiation response in T172, the mobile terminal 200 determines which of the mobile terminal 200 and the MFP 10 is to operate in the G/O state. In the present case, the mobile terminal 200 determines that the mobile terminal 200 is to operate in the G/O state and, in T174, sends a G/O Negotiation confirmation for notifying this determination, to the MFP 10.

Then, in T180, the MFP 10 completes the G/O shift operation, and operates in the G/O state. That is, the MFP 10 shifts to the G/O state despite the determination in the G/O negotiation of T170 to T174 that the MFP 10 is to operate as a child station. That is, a situation occurs in which both the MFP 10 and the mobile terminal 200 are operating in the G/O state. In this occasion, a WSC Exchange is not executed between the MFP 10 and the mobile terminal 200. The reason therefore is as follows: before the WSC Exchange, the device which is to operate as a child station sends a signal fear starting the WSC Exchange (e.g., a Probe request including WSCIE) to the device which is to operate as the G/O. In the situation where both the MFP 10 and the mobile terminal 200 are operating in the G/O state, the signal is not communicated, and consequently the WSC exchange is not executed. As a result, the establishment of a Wi-Fi connection between the MFP 10 and the mobile terminal 200 fails.

Comparative Embodiment 2

Figure 5:
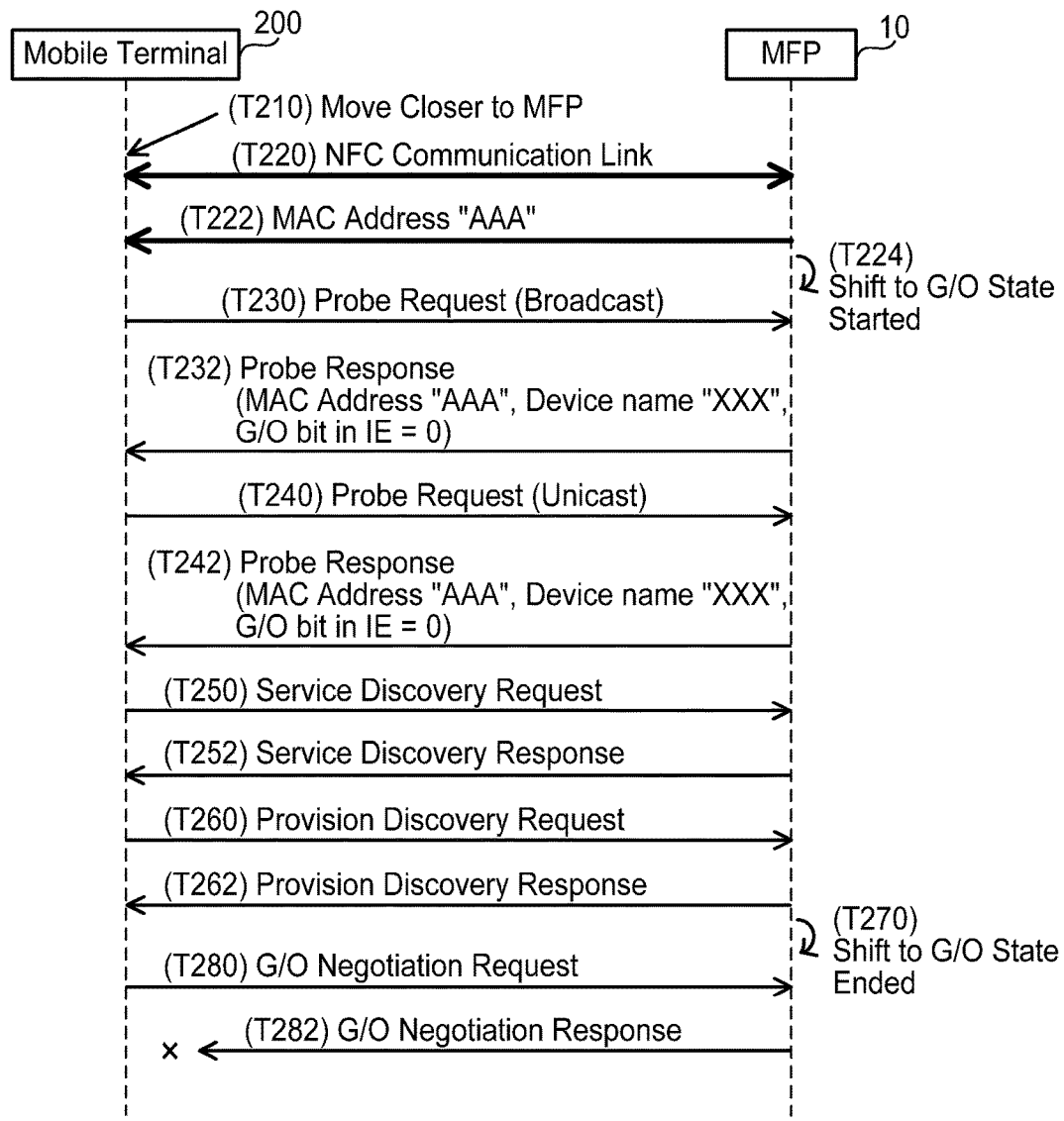
FIG. 5 shows a sequence diagram of failing to establish a Wi-Fi connection between the mobile terminal and the MFP in comparative embodiment 2.

Next, a comparative embodiment 2, in which establishment of a Wi-Fi connection is failed between the mobile terminal 200 and the MFP 10, will be described with reference to FIG. 5.

Comparative embodiment 2 differs from comparative embodiment 1 in a timing at which the G/O shift operation is completed in the MFP 10. T210 to T262 are the same as T110 to T162 of FIG. 4. In comparative embodiment 2, the G/O shift operation is completed in the MFP 10 in a timing of T270.

Then, in T280, the mobile terminal 200 sends a G/O Negotiation request to the MFP 10. At this stage, the operation state of the MFP 10 is the G/O state. As a result, even though the MFP 10 receives the G/O Negotiation request, the MFP 10 does not send a G/O Negotiation response to the mobile terminal 200. Consequently, the processes from the WSC Exchange, onward are not executed, and the establishment of a Wi-Fi connection between the MFP 10 and the mobile terminal 200 fails.

Effect of First Embodiment

As described above, a certain amount of time is needed to shift the MFP 10 to the G/O state (i.e., the G/O shift time (e.g., 1 to 2 seconds)). As shown in comparative embodiments 1 and 2, when a communication for establishing a Wi-Fi connection between the MFP 10 and the mobile terminal 200 is executed before the G/O shift operation is completed, the establishment of the Wi-Fi connection between the MFP 10 and the mobile terminal 200 fails. In contrast, in the present embodiment, the mobile terminal 100 executes the connection process (S30) in a case where the G/O bit in the Probe response received from the MFP 10 indicates "1" (YES in S26 of FIG. 2), and does not execute the connection process in a case where the G/O bit in the Probe response indicates "0" (NO in S26). That is, the mobile terminal 100 executes the connection process in a case where it is continued that the operation state of the MFP 10 is the G/O state. Consequently, the mobile terminal 100 can appropriately participate as a child station in the WFDNW in which the MFP 10 operates as the G/O.

Correspondence Relationship

The mobile terminal 100 and the MFP 10 are an example of "communication device" and "external device", respectively. The NFC I/F 122 and the Wi-Fi I/F 120 are an example of "first wireless interface" and "second wireless interface", respectively. The NFC communication and the communication are an example of "first wireless communication" and "second wireless communication", respectively. The G/O bit indicating "1" is an example of "parent station information". The WFDNW is an example of "wireless network". The first connection request instruction, the broadcast sending instruction, and the stop instruction of the Probe request are an example of "communication instruction", "first sending instruction", and "stop instruction", respectively. The Probe response of T52 of FIG. 3, and the Probe requests of T30 and T50 are an example of "specific signal" and "first signal", respectively.

Second Embodiment

Figure 6:
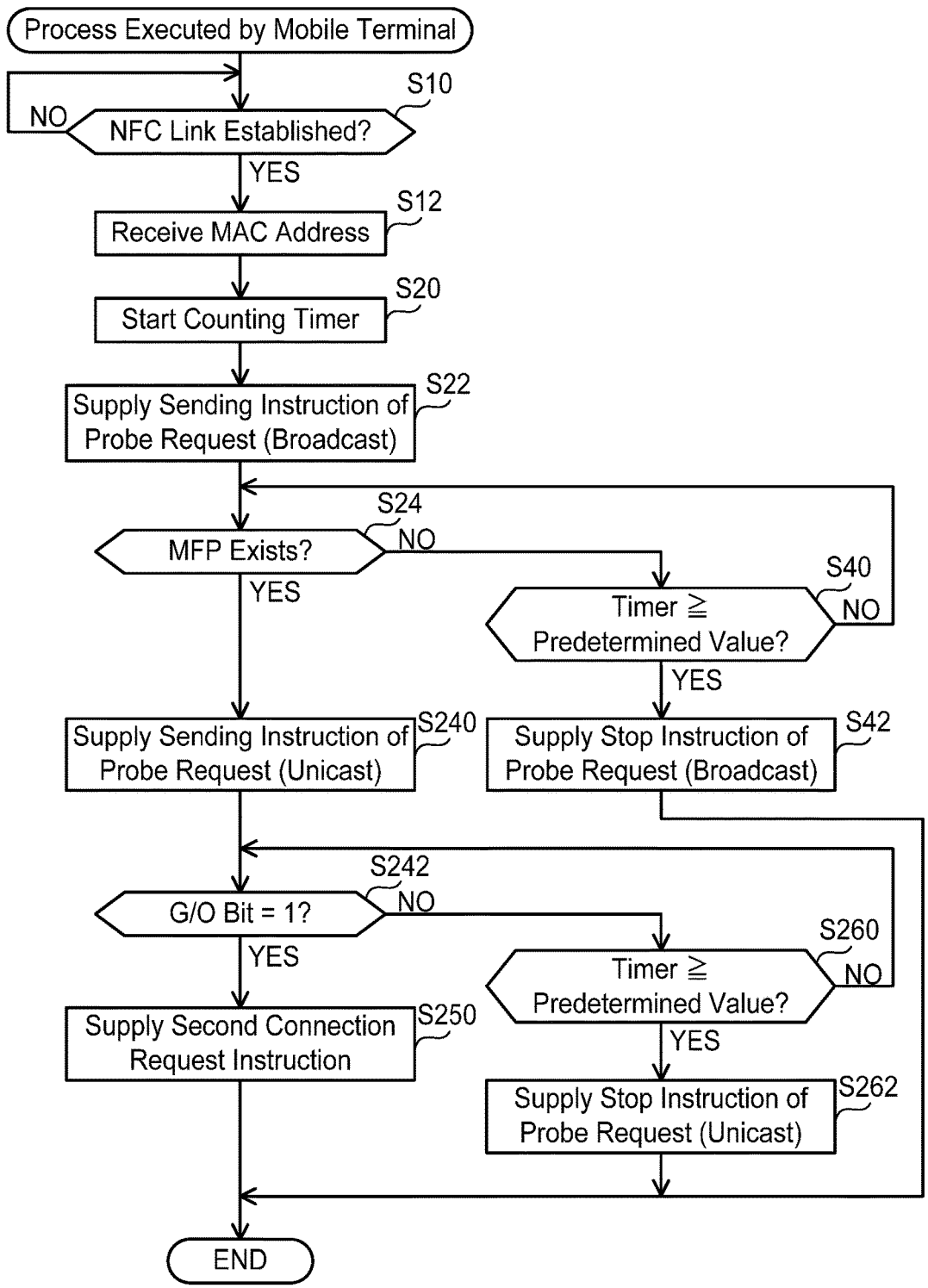
FIG. 6 shows a flowchart of processes executed by a mobile terminal of a second embodiment.

In the present embodiment, the mobile terminal 100 executes a process of FIG. 6 instead of the process of FIG. 2. Processes which are the same as the first embodiment have the same reference numbers appended thereto, and a description thereof is omitted, In a case where YES is determined in S24, in S240, the application 138 supplies a unicast sending instruction of a Probe request to the OS 136. Upon obtaining the unicast sending instruction, the OS 136 supplies the unicast sending instruction to the Wi-Fi I/F 120. Thereby, the Wi-Fi I/F 120 stops the sending of the Probe request by broadcast, and sends a Probe request including the MAC address "AAA" to the MFP 10. The OS 136 receives a Probe response from the MFP 10 via the Wi-Fi I/F 120 in response to the sending of the Probe request. The OS 136 supplies the information in the Probe response to the application 138.

S242 is the same as S26 of FIG. 2. In a case where the G/O bit indicates "1", the application 138 determines YES in S242, and proceeds to S250. On the other hand, in a case where the G/O bit indicates "0", the application 138 determines NO in S242, and proceeds to S260.

In S250, the application 138 supplies a second connection request instruction to the OS 136. The second connection request instruction includes an establishment instruction. Upon obtaining the second connection request instruction, the OS 136 supplies the second connection request instruction to the Wi-Fi I/F 120. Thereby, the Wi-Fi 120 stops the sending of the Probe request including the MAC address "AAA". Then, the OS 136 executes a connection process (i.e., communication of Service Discovery, Provision Discovery, WSC Exchange, Authentication, Association, 4-way Handshake) in order to establish a Wi-Fi connection with the MFP 10 which is in the G/O state. Thereby, the OS 136 establishes a Wi-Fi connection with the MFP 10, and participates as a child station, in the WFDNW in which the MFP 10 operates as the G/O. When S250 ends, the process of FIG. 6 ends.

Further, in S260, the application 138 determines whether the count value of the timer is equal to or above a predetermined value. In a case where the count value of the timer is equal to or above the predetermined value, the application 138 determines YES in S260 and, in S262, supplies a stop instruction of a Probe request to the OS 136. Upon obtaining the stop instruction, the OS 136 supplies the stop instruction to the Wi-Fi I/F 120. Thereby, the Wi-Fi I/F 120 stops the sending of the Probe request including the MAC address "AAA". When. S262 ends, the process of FIG. 6 ends.

Effect of Second Embodiment

In the present embodiment, the mobile terminal 100 executes the connection process (S250) in the case where the G/O bit in the Probe response to the unicast Probe request indicates "1" (YES in S242), and does not execute the connection process in the case where the G/O bit in the Probe response indicates "0" (NO in S242). That is, the mobile terminal 100 executes the connection process in a case where it is confirmed that the operation state of the MFP 10 is the G/O state. Consequently, the mobile terminal 100 can appropriately participate as a child station in the WFDNW in which the MFP 10 operates as the G/O.

As described above, in the first embodiment, it is determined whether the G/O bit in the Probe response to the broadcast Probe request indicates "1" (S26 of FIG. 2) and, in the case where the G/O bit indicates "1", the communication of the unicast Probe request is executed, and then the communication of the Service Discovery, etc. is executed (S30). By contrast, in the present embodiment, it is determined whether the G/O bit in the Probe response to the unicast Probe request indicates "1" (S242) and, in the case where the G/O bit indicates "1", the communication of the Service Discovery, etc. is executed (S250). That is, after it has been confirmed that the operation state of the MFP 10 is the G/O state (i.e., YES in S242), the communication of the unicast Probe request does not need to be executed. Consequently, it is possible to shorten the period from confirmation that the operation state of the MFP 10 is the G/O state until establishment of the Wi-Fi connection between the MFP 10 and the mobile terminal 100.

Correspondence Relationship

The unicast sending instruction of the Probe request, and the broadcast sending instruction of the Probe request are an example of "first sending instruction" and "second sending instruction", respectively. The unicast Probe request, and the broadcast Probe request are an example of "first signal" and "second signal", respectively.

(Variant 1) When shifting from the device state to the G/O state is completed, the MFP 10 may send a signal to the mobile terminal 100 indicating that the MFP 10 is the G/O state, this signal being a special signal not according to the communication standard. In this case, after having established an NFC link with the MFP 10, the application 138 supplies the first connection request instruction to the OS 136 in a case of receiving the signal, and does not supply the first connection request instruction to the OS 136 in a case of not receiving the signal. In the present variant, the signal is an example of "specific signal", and "supply a first sending instruction" may be omitted.

(Variant 2) The application 135 may not supply the stop instruction to the OS 136. That is, S40 and S42 of FIG. 2 may be omitted. In the present variant, "supply a stop instruction" may be omitted.

(Variant 3) "Communication device" is not restricted to the mobile terminal 100, but may be a printer, a scanner, an MFP, a stationary PC, a server, or the like. "External device" is not restricted to the MFP 10, but may be a printer, a scanner, a mobile terminal, a stationary PC, a server, or the like.

What is claimed is:

1. A non-transitory computer-readable recording medium storing computer-readable instructions for a communication device,
wherein the computer-readable instructions, when executed by a processor of the communication device, cause the communication device to:
in a case where a first wireless communication with an external device is executed via a first wireless interface of the communication device, determine whether a specific signal including parent station information is received from the external device via a second wireless interface of the communication device, the second wireless interface being different from the first wireless interface, the parent station information indicating that an operation state of the external device is a state in which the external device operates as a parent station of a wireless network; and
supply a communication instruction to the second wireless interface in a case where it is determined that the specific signal including the parent station information is received, the communication instruction being for executing a second wireless communication with the external device via the second wireless interface, the second wireless communication including a communication for participating as a child station in the wireless network in which the external device operates as the parent station, wherein the communication instruction is not supplied to the second wireless interface in a case where it is determined that the specific signal including the parent station information is not received.

2. The non-transitory computer-readable recording medium as in claim 1, wherein
the computer-readable instructions, when executed by the processor, further cause the communication device to:
supply a first sending instruction to the second wireless interface in a case where the first wireless communication with the external device is executed, the first sending instruction being for causing the second wireless interface to execute sending a first signal to the external device,
wherein the specific signal is a response signal of the first signal.

3. The non-transitory computer-readable recording medium as in claim 2, wherein
the computer-readable instructions, when executed by the processor, further cause the communication device to:
supply a stop instruction to the second wireless interface in a case where the specific signal including the parent station information is not received until a predetermined time has been elapsed since the first wireless communication with the external device has been executed, the stop instruction being for causing the second wireless interface to stop the sending of the first signal,
wherein the second wireless interface is configured to execute the sending of the first signal to the external device repeatedly until the communication instruction or the stop instruction has been obtained since the first sending instruction has been obtained.

4. The non-transitory computer-readable recording medium as in claim 2, wherein
the first sending instruction is for causing the second wireless interface to execute broadcast sending of the first signal.

5. The non-transitory computer-readable recording medium as in claim 2, wherein
the computer-readable instructions, when executed by the processor, further cause the communication device to:
supply a second sending instruction to the second wireless interface in a case where the first wireless communication with the external device is executed, the second sending instruction being for causing the second wireless interface to execute broadcast sending of a second signal,
wherein the first sending instruction is supplied to the second wireless interface in a case where a response signal of the second signal is received from the external device via the second wireless interface,
the first sending instruction is for causing the second wireless interface to execute unicast sending of the first signal to the external device, and
the specific signal is a response signal of the first signal.

6. The non-transitory computer-readable recording medium as in claim 2, wherein
the first signal is a Probe request,
the specific signal is a Probe response,
it is determined that the specific signal including the parent station information is received in a case where a P2P Group Owner bit in information Element included in the specific signal indicates a first value, and
it is determined that the specific signal is not received in a case where the P2P Group Owner bit indicates a second value different from the first value.

7. A communication device comprising:
a first wireless interface;
a second wireless interface different from the first wireless interface;
a processor; and
a memory storing computer-readable instructions therein, the computer-readable instructions, when executed by the processor, causing the communication device to:
in a case where a first wireless communication with an external device is executed via the first wireless interface, determine whether a specific signal including parent station information is received from the external device via the second wireless interface, the parent station information indicating that an operation state of the external device is a state in which the external device operates as a parent station of a wireless network, and
supply a communication instruction to the second wireless interface in a case where it is determined that the specific signal including the parent station information is received, the communication instruction being for executing a second wireless communication with the external device via the second wireless interface, the second wireless communication including a communication for participating as a child station in the wireless network in which the external device operates as the parent station, wherein the communication instruction is not supplied to the second wireless interface in a case where it is determined that the specific signal including the parent station information is not received.

8. A method executed by a communication device, the method comprising:

in a case where a first wireless communication with an external device is executed via a first wireless interface of the communication device, determining whether a specific signal including parent station information is received from the external device via a second wireless interface of the communication device, the second wireless interface being different from the first wireless interface, the parent station information indicating that an operation state of the external device is a state in which the external device operates as a parent station of a wireless network; and supplying a communication instruction to the second wireless interface in a case where it is determined that the specific signal including the parent station information is received, the communication instruction being for executing a second wireless communication with the external device via the second wireless interface, the second wireless communication including a communication for participating as a child station in the wireless network in which the external device operates as the parent station, wherein the communication instruction is not supplied to the second wireless interface in a case Where it is determined that the specific signal including the parent station information is not received.

* * * * *